US009796484B2

(12) United States Patent
Sauzay et al.

(10) Patent No.: US 9,796,484 B2
(45) Date of Patent: Oct. 24, 2017

(54) SATELLITE SYSTEM COMPRISING TWO SATELLITES ATTACHED TO EACH OTHER AND METHOD FOR LAUNCHING THEM INTO ORBIT

(71) Applicant: AIRBUS DEFENCE AND SPACE SAS, Les Mureaux (FR)

(72) Inventors: Emmanuel Sauzay, Monestrol (FR); Nathanael Chabert, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 14/783,654

(22) PCT Filed: Apr. 7, 2014

(86) PCT No.: PCT/EP2014/056924
§ 371 (c)(1),
(2) Date: Oct. 9, 2015

(87) PCT Pub. No.: WO2014/166866
PCT Pub. Date: Oct. 16, 2014

(65) Prior Publication Data
US 2016/0075453 A1    Mar. 17, 2016

(30) Foreign Application Priority Data
Apr. 9, 2013 (FR) ...................... 13 00813

(51) Int. Cl.
*B64G 1/64* (2006.01)
*B64G 1/10* (2006.01)
*B64G 1/00* (2006.01)

(52) U.S. Cl.
CPC ............... *B64G 1/10* (2013.01); *B64G 1/002* (2013.01); *B64G 1/005* (2013.01); *B64G 1/007* (2013.01);
(Continued)

(58) Field of Classification Search
CPC .......... B64G 1/10; B64G 1/002; B64G 1/007; B64G 1/1085; B64G 1/64; B64G 1/641;
(Continued)

(56) References Cited

U.S. PATENT DOCUMENTS 3,363,857 A * 1/1968 Vilbig ...................... B64G 1/10
244/1 R
3,532,428 A * 10/1970 Coogan ..................... B64G 1/66
250/226
(Continued)

FOREIGN PATENT DOCUMENTS

| EP | 1 038 772 A2 | 9/2000 | |
| NL | EP 2837568 A2 * | 2/2015 | ............. B64G 1/641 |
| WO | 92/00223 A1 | 1/1992 | |

OTHER PUBLICATIONS

International Search Report, dated Jul. 22, 2014, from corresponding PCT application.

*Primary Examiner* — Tien Dinh
*Assistant Examiner* — Michael A Fabula
(74) *Attorney, Agent, or Firm* — Young & Thompson

(57) ABSTRACT

A satellite system includes a so-called carrier satellite and a so-called piggyback satellite, each one having an Earth face. The piggyback satellite is attached to the carrier satellite by fastening elements that can be released on command. The piggyback satellite includes propulsion elements suitable for maintaining same in orbit, and the carrier satellite includes propulsion elements for performing a change of orbit of the satellite system including the carrier satellite and the piggyback satellite. The piggyback satellite is attached to the Earth face of the carrier satellite in such a way that the Earth face of the piggyback satellite is essentially perpendicular to the Earth face of the carrier satellite.

13 Claims, 3 Drawing Sheets

(52) U.S. Cl.
CPC .... *B64G 1/1085* (2013.01); *B64G 2001/1092* (2013.01); *B64G 2001/643* (2013.01)

(58) Field of Classification Search
CPC ... B64G 1/645; B64G 1/648; B64G 2001/643
See application file for complete search history.

(56) References Cited

U.S. PATENT DOCUMENTS

| | | | | |
|---|---|---|---|---|
| 3,652,042 A * | 3/1972 | Welther | ................... | B64G 1/00 244/173.3 |
| 3,907,225 A * | 9/1975 | Welther | ................ | B64G 1/007 102/377 |
| 4,384,692 A * | 5/1983 | Preukschat | .......... | B64G 1/1007 136/292 |
| 4,664,343 A * | 5/1987 | Lofts | ...................... | B64G 1/007 244/171.1 |
| 4,896,848 A * | 1/1990 | Ballard | ................. | B64G 1/007 244/171.3 |
| 5,152,482 A * | 10/1992 | Perkins | .................... | B64G 1/22 244/159.4 |
| 5,178,347 A * | 1/1993 | Johnson | ................. | B64G 1/002 244/158.5 |
| 5,199,672 A * | 4/1993 | King | ...................... | B64G 1/007 244/164 |
| 5,271,582 A * | 12/1993 | Perkins | .................... | B64G 1/22 244/159.4 |
| 5,411,226 A * | 5/1995 | Jones | ..................... | B64G 1/641 244/173.3 |
| 5,605,308 A * | 2/1997 | Quan | ..................... | B64G 1/641 102/489 |
| 5,613,653 A * | 3/1997 | Bombled | ............... | B64G 1/641 244/173.1 |
| 5,720,450 A * | 2/1998 | Kanne | ..................... | B64G 5/00 244/118.1 |
| 6,138,951 A * | 10/2000 | Budris | .................. | B64G 1/002 102/393 |
| 6,296,206 B1 * | 10/2001 | Chamness | ................ | B64G 1/00 244/173.3 |
| 6,416,018 B2 * | 7/2002 | DiVerde | ................. | B64G 1/002 244/137.1 |
| 6,494,406 B1 * | 12/2002 | Fukushima | ............ | B64G 1/002 244/173.3 |
| 6,789,767 B2 * | 9/2004 | Mueller | ................. | B64G 1/007 244/173.3 |
| 7,866,607 B2 * | 1/2011 | Benedict | ................ | B64G 1/641 244/172.4 |
| 7,905,453 B2 * | 3/2011 | Benedict | ................ | B64G 1/641 244/172.4 |
| 8,511,617 B2 * | 8/2013 | Caplin | ................. | B64G 1/1085 244/158.1 |
| 8,789,797 B2 * | 7/2014 | Darooka | ................ | B64G 1/10 244/159.4 |
| 9,073,646 B2 * | 7/2015 | Balemboy | ............. | B64G 1/105 |
| 2002/0179776 A1 * | 12/2002 | Mueller | ................. | B64G 1/007 244/158.5 |
| 2004/0026571 A1 * | 2/2004 | Scott | ..................... | B64G 1/007 244/172.5 |
| 2005/0258311 A1 * | 11/2005 | Scott | ..................... | B64G 1/007 244/172.4 |
| 2008/0078886 A1 * | 4/2008 | Foster | ................... | B64G 1/002 244/173.1 |
| 2008/0149776 A1 * | 6/2008 | Benedict | ............... | B64G 1/641 244/158.1 |
| 2008/0149777 A1 * | 6/2008 | Benedict | ............... | B64G 1/641 244/158.1 |
| 2008/0237399 A1 | 10/2008 | Caplin et al. | | |
| 2008/0265098 A1 * | 10/2008 | Connelly | ............... | B64G 1/007 244/158.1 |
| 2012/0012711 A1 * | 1/2012 | Ross | ..................... | B64G 1/641 244/158.2 |
| 2012/0210808 A1 * | 8/2012 | Balemboy | ............. | B64G 1/105 73/866.5 |
| 2012/0261515 A1 * | 10/2012 | Smith | ................... | B64G 1/002 244/173.3 |
| 2013/0299641 A1 * | 11/2013 | Aston | ................... | B64G 1/002 244/171.1 |
| 2015/0232205 A1 * | 8/2015 | Lively | ................... | B64G 1/002 244/2 |

* cited by examiner

SATELLITE SYSTEM COMPRISING TWO SATELLITES ATTACHED TO EACH OTHER AND METHOD FOR LAUNCHING THEM INTO ORBIT

The present invention falls within the field of the placing of satellites in orbit. More particularly, it relates to a satellite system comprising at least two satellites fixed to one another, and a method for stationing on its mission orbit each of said two satellites, by a same launch operation from the Earth's surface.

CONTEXT OF THE INVENTION AND PROBLEM POSED

The stationing of a satellite on its mission orbit requires launch operations to be performed from the Earth's surface, by means of a specifically dedicated vehicle, commonly called launch vehicle. This launch vehicle comprises a detachable fairing under which the satellite is fixed and protected during a launch phase, and it is suitable for injecting the satellite into an initial orbit, called transfer orbit, from which the satellite is then transferred to its mission orbit by means of its own propulsion system.

The cost of a launch operation and of a launch vehicle is very steep, so it has been proposed in the prior art to use a same launch vehicle to simultaneously or quasi-simultaneously inject a plurality of satellites into the initial orbit. A number of strategies have been proposed to this end.

By way of example, it has been proposed by the prior art to fix a plurality of satellites onto a support structure joined to the launch vehicle, such as a ring or a multi-stage structure. Such a support structure does however add weight to the assembly, which means, for a launcher with given launch capacity, restricting the payload with which the satellites are equipped, or increasing the capacity of the launcher and therefore the cost of the launch. Finally, such a solution entails developing satellites of specific and standardized configuration suited to the support structure.

It has also been proposed by the prior art, for example by the document US-A-2008/0237399, to stack a plurality of satellites one on top of the other in a launch vehicle, then, once they have been injected into the initial orbit, to transfer them one after the other, sequentially, into their mission orbit. The saving obtained by such a solution is, however, limited, notably because of the multiplication of the heavy propulsion systems and propellant reserves with which each satellite is equipped and that are necessary for its subsequent transfer into its mission orbit. There again, this means either increasing the launch capacity of the launch vehicle, and thereby the cost of the launch, or reducing the payload mass with which the satellites are equipped.

In order to mitigate this drawback, consideration has been given to implementing a sharing of thrust between two satellites launched by a same launch vehicle, for their transfer from the initial orbit to the mission orbit, and more particularly to have all of this thrust produced by a first of the satellites, the size of which is greater than that of the second satellite, primarily by virtue of the fact that this first satellite is then provided with a propulsion system and a propellant reserve that are suitable for ensuring a transfer of all of the satellites from the initial orbit to the mission orbit. Such a solution makes it possible to reduce the ratio between the launch cost and the payload mass with which the satellites are equipped. It has been considered for many space missions, among which can be cited, for example, the Chilean satellite FASAT-Alpha which was mounted on the Ukrainian satellite SICH-1, launched in 1995, and which was meant to be separated once the Ukrainian satellite was stationed on an Earth mission orbit, to conduct its own mission. The FFMO (Free Flying Micro Operator) study, which was the subject of a report for the ESA in 1999, also disclosed the concept of a microsatellite fixed onto a satellite, the whole being stationed in geostationary orbit, and the microsatellite then separating from the satellite to carry out a specific mission on the geostationary arc.

OBJECTIVES OF THE INVENTION

The present invention is based on such a principle of sharing of thrust between a first satellite of significant propulsion capacity, and a second satellite of smaller size and limited propulsion capacity. More particularly, the present invention aims to propose a system for stationing a plurality of satellites, launched simultaneously from the Earth's surface by a same launch vehicle, on their mission orbit, which remedies the drawbacks of the systems proposed by the prior art, notably those explained above, and which makes it possible, in particular, not only to reduce the cost of simultaneously launching the plurality of satellites by minimizing the mass of the propulsion systems with which the satellites are equipped, but also to optimize the occupancy of the volume available under the fairing of the standard launch vehicles, and do so without having to impose a particular and standardized configuration on the satellites launched.

Additional objectives of the invention are that this system requires little in the way of specific electrical/electronic equipment, and that it does not generate any debris in space.

DESCRIPTION OF THE INVENTION

To this end, there is proposed, according to the present invention, a satellite system comprising a first satellite, called carrier satellite, and a second satellite, called piggyback satellite, each of these satellites comprising an Earth face. The Earth face of the satellites is here defined conventionally in itself, that is to say as the face of the satellite globally directed toward the Earth when the satellite is stationed in its mission orbit, this face being substantially at right angles to the longitudinal axis of the satellite, called Earth axis, which then joins the center of mass of the satellite and the center of the Earth. The Earth face of the satellite generally bears the communication instruments of the satellite, such as the telecommunication, control, telemetry and other such sensors and antennas.

In the system according to the invention:
the piggyback satellite is fixed to the carrier satellite by attachment means that can be released on command to provoke the separation of the carrier satellite and of the piggyback satellite,
the piggyback satellite comprises propulsion means suitable for keeping it in orbit, in its mission orbit, and, if appropriate, transferring it, at end of life, into its graveyard orbit,
and the carrier satellite comprises propulsion means suitable for performing a change of orbit of the satellite system, comprising the carrier satellite and the piggyback satellite which is fixed to it, from the transfer orbit to the mission orbit of the piggyback satellite, and, if appropriate, a change of orbit of the carrier satellite alone from the mission orbit of the piggyback satellite to the mission orbit of the carrier satellite, and for keeping the carrier satellite therein, and transferring it, at end of life, into its graveyard orbit.

Furthermore, the piggyback satellite is fixed onto the Earth face of the carrier satellite, such that the Earth face of the piggyback satellite is substantially at right angles to the Earth face of the carrier satellite.

"Substantially at right angles" should be understood to mean the fact that the piggyback satellite is not fixed to the carrier satellite by its Earth face, or by its opposite so-called anti-Earth face, but by another of its faces, such that its Earth face is globally at right angles, to within a few degrees, more particularly to within an angle of a value less than 10 degrees, to the Earth face of the carrier satellite taken overall.

Such an arrangement of the piggyback satellite relative to the carrier satellite, which is itself fixed in the launch vehicle by a so-called anti-Earth face opposite the Earth face, proves very advantageous from the point of view of optimization of the occupancy of the volume under the fairing of the launcher, which typically has a substantially circular section decreasing toward its top end. In effect, such an arrangement advantageously makes it possible, depending on the desired launch configuration, and on the missions for which the satellites are intended, in a given volume under fairing of the launch vehicle:

- to incorporate a piggyback satellite equipped with a significant volume of payload, and notably a significant quantity of instruments arranged on its Earth face, an increasing of the surface thereof then being little constrained by the gradual reduction of diameter of the fairing of the launch vehicle,
- and/or to stack one or more additional piggyback satellites on the first piggyback satellite, this plurality of satellites then being able to be launched simultaneously at lower cost,
- and/or to stack, on the Earth face of the carrier satellite, sensors and/or antennas requiring a wide field of view toward the Earth, the impact of the accommodation of the piggyback satellite on the carrier satellite, and on the accommodation of such equipment, on the Earth face thereof, being minimized by such an arrangement.

According to the invention, the piggyback satellite has a size greatly less than that of the carrier satellite, primarily because of the reduced capacity of its propulsion means, comprising the propulsion system and the associated propellant reserve, which are preferably configured to be unsuited to ensuring a transfer of the piggyback satellite from the initial orbit to its mission orbit.

In a sequence of stationing of the satellites involved in the make-up of the satellite system according to the invention, these satellites are initially arranged, on the Earth's surface, in a same launch vehicle, under the fairing thereof, and in a manner that is conventional in itself. The fixing to this launch vehicle is implemented at the carrier satellite level, and in such a way that the piggyback satellite is arranged above the carrier satellite, in the normal configuration of use of the launcher, at the top end of the fairing. The launch vehicle is conventional in itself, and comprises propulsion means and guiding means suitable for ensuring its launch from the Earth and the injection of the satellite system into the initial orbit, generally in a low Earth transfer trajectory.

Once this injection is completed, the carrier satellite and the piggyback satellite, still fixed to one another, continue their trajectory autonomously until they reach the orbital position that is appropriate for the piggyback satellite.

According to particular embodiments, the invention also comprises the following features, implemented separately or in each of their technically feasible combinations.

The attachment means for attaching the piggyback satellite onto the carrier satellite can be of any conventional type in itself. The means that do not generate debris upon release, such as pyrotechnical devices or mechanical ring devices, are particularly preferred in the context of the invention. Preferentially, these attachment means are also chosen to generate low impact levels in order to not affect the in-flight performance of the equipment of the carrier satellite located on its Earth face, in proximity thereto. Examples of such attachment means that can be cited include the so-called "cup and cone" system, pyrotechnic bolts or the "clamp-band" type mechanisms commonly implemented on satellite-launcher interfaces. Such attachment systems are well known to those skilled in the art.

In particular, particularly advantageous, embodiments of the invention the carrier satellite and the piggyback satellite do not share any data bus, so that their assembly and implementation require only a very simple electrical/electronic interface. The data propagation analyses and the complete system validation are consequently greatly simplified, and the risk of propagation of failure between the carrier satellite and the piggyback satellite are advantageously reduced. There is thus no need, before the launch, to carry out a study of compatibility between the satellites, and satellites of all types, including of different types, can be included, without requiring substantial modifications, in the make-up of the satellite system according to the invention.

In particular embodiments of the invention, the system comprises slaving means for slaving the starting up of the piggyback satellite to the releasing of the attachment means for the separation of the carrier satellite and of the piggyback satellite. The piggyback satellite thus remains passive as long as it is fixed to the carrier satellite, its starting up being advantageously performed automatically on separation from the carrier satellite. In particular embodiments of the invention, these slaving means are arranged in the piggyback satellite.

Generally, the interface between the carrier satellite and the piggyback satellite is preferentially reduced to the strict minimum, to a mechanical interface, and, if appropriate, to very small heat exchanges, preferably of less than 4 W.

In particular embodiments of the invention, the satellite system comprises means for heating up the piggyback satellite, comprising heating lines (30 in FIG. 1), equipped with thermistors, commonly called heating harness, located in the piggyback satellite, and means for controlling and electrically powering these heating lines located in the carrier satellite. These means are preferentially configured to obtain a heating power of less than 300 W. Such a heating harness advantageously makes it possible to heat up the piggyback satellite during the launch phase and the orbit transfer phase. It constitutes an extension of the carrier satellite's own heating harness. This harness is preferably configured to be made unuseable after the separation with the carrier satellite. The interface connectors are conventional in themselves, and can notably be similar to the launcher interface umbilical connectors.

In particularly preferred embodiments of the invention, the carrier satellite comprises a substantially cylindrical rigid so-called support structure, which defines the longitudinal axis, called Earth axis, of the carrier satellite extending between the Earth face and the opposite anti-Earth face thereof. The piggyback satellite is fixed onto this support structure, preferably substantially centered on the longitudinal axis of the carrier satellite. Such a support structure, conventional in itself, gives the carrier satellite properties of mechanical resistance, in particular to the longitudinal stresses, and of enhanced stability. This structure supports in particular the power supply, control, telemetry, communication and other such systems of the carrier satellite.

Such an embodiment notably makes it possible to fix, onto the Earth face of the carrier satellite, a piggyback satellite of great weight, this weight advantageously being mostly attributed to the payload with which the piggyback satellite is equipped, and does so without requiring specific modifications to the structure of the carrier satellite to enable it to support the weight of the piggyback vehicle.

Accordingly to a particularly advantageous feature of the invention, the satellite system can comprise a plurality of piggyback satellites stacked one on top of the other on the Earth face of the carrier satellite, the Earth face of each of these piggyback satellites being substantially at right angles to the Earth face of the carrier satellite. These piggyback satellites, all provided with propulsion means suitable for keeping them in orbit, in the mission orbit, and, if appropriate, transferring them, at the end of life, into the graveyard orbit, and preferably not suitable for ensuring the transfer from the initial orbit to the mission orbit, may be identical or different, and preferentially meet one or more of the features described above.

Preferentially, this plurality of piggyback satellites is stacked along a same axis, preferably along the longitudinal axis of the carrier satellite.

In such particular embodiments of the satellite system according to the invention, it is also particularly advantageous for the carrier satellite to address the feature mentioned above, according to which it comprises a rigid support structure defining a longitudinal axis thereof, and for the stacking of the piggyback satellites to be done on this support structure.

According to another aspect, the invention relates to an assembly comprising a launch vehicle in which there is arranged a satellite system that meets one or more of the above features.

A third aspect of the invention relates to a method for stationing on its mission orbit each of the satellites of a set of satellites comprising a first satellite, called carrier satellite, and a second satellite, called piggyback satellite, preferentially of smaller size than the carrier satellite, each of these satellites comprising an Earth face.

This method comprises, as first step a), the formation of a satellite system meeting one or more of the above features. This first step notably comprises:
  the configuration of the propulsion means of the piggyback satellite to be suitable to keep the latter in its mission orbit, and, if appropriate, transfer it, at the end of life, into its graveyard orbit, and preferably to be ill-suited to perform a transfer of orbit of the piggyback satellite from an initial orbit to its mission orbit,
  the configuration of the propulsion means of the carrier satellite to be suitable for performing a change of orbit of the satellite system, comprising the carrier satellite and the piggyback satellite which is fixed to it, from the initial orbit to the mission orbit of the piggyback satellite, and, if appropriate, a change of orbit of only the carrier satellite from the mission orbit of the piggyback satellite to the mission orbit of the carrier satellite, as well as for keeping the carrier satellite therein, and for transferring it, at the end of life, into its graveyard orbit,
  and the fixing of the piggyback satellite to the carrier satellite by the attachment means that can be actuated on command to provoke the separation of the carrier satellite and of the piggyback satellite, in such a way that the Earth face of the piggyback satellite is substantially at right angles to the Earth face of said carrier satellite.

The method according to the invention further comprises successive steps of:
  b) placement of the duly formed satellite system in a launch vehicle suitable for transferring it from the Earth's surface to the initial orbit,
  c) injection of the satellite system into the initial orbit by the launch vehicle,
  d) transfer of the satellite system, by the propulsion means of the carrier satellite, into or in proximity to the mission orbit of the piggyback satellite,
  e) separation of the carrier satellite and of the piggyback satellite, by releasing of the attachment means, so as to allow the latter to be stationed in the desired orbital position,
  f) and, if appropriate, transfer of the carrier satellite into its mission orbit, if the latter is different from the mission orbit of the piggyback satellite.

The transfer of the satellite system comprising the carrier satellite and the piggyback satellite, from the initial orbit to the mission orbit of the piggyback satellite, can, if appropriate, comprise transition steps in intermediate orbits.

The steps of placement of the satellite system in the launch vehicle, of injection into the initial orbit and of transfer in or in proximity to the mission orbit of the piggyback satellite are implemented in a way that is conventional in itself. During all of these steps, the piggyback satellite remains passive.

The separation of the carrier satellite and of the piggyback satellite, for the stationing of the latter in the desired orbital position, can be performed in different ways that are known in themselves, and chosen to avoid any risk of collision between the carrier satellite and the piggyback satellite. This separation can be performed either tangentially or radially.

The expression "in proximity to the mission orbit of the piggyback satellite" should be understood to mean that the separation of the piggyback satellite and of the carrier satellite can be performed under the mission orbital arc of the piggyback satellite, but close enough thereto for it to be able to reach it, by one or more low-amplitude orbit correction maneuvers, tangential maneuvers commonly called "east" and "west".

In particular implementations of the invention, the mission orbit of the carrier satellite and/or of the piggyback satellite is the geostationary orbit. The initial orbit is, for its part, then preferentially a geostationary transfer orbit.

When the satellite system comprises a plurality of piggyback satellites stacked one on top of the other, as described above, the method comprises the iteration, for each of the piggyback satellites, of the above steps d) and e).

In such implementations, the separation of each piggyback satellite from the carrier satellite can be performed simultaneously or sequentially. In other words, all of the satellites carried can be separated from the carrier satellite, then the piggyback satellites can be separated from one another in a second step.

BRIEF DESCRIPTION OF THE FIGURES

The invention will now be described more specifically in the context of preferred embodiments, which are in no way limiting, represented in FIGS. 1 to 3, in which.

DETAILED DESCRIPTION OF AN EMBODIMENT OF THE INVENTION

Figure 1:
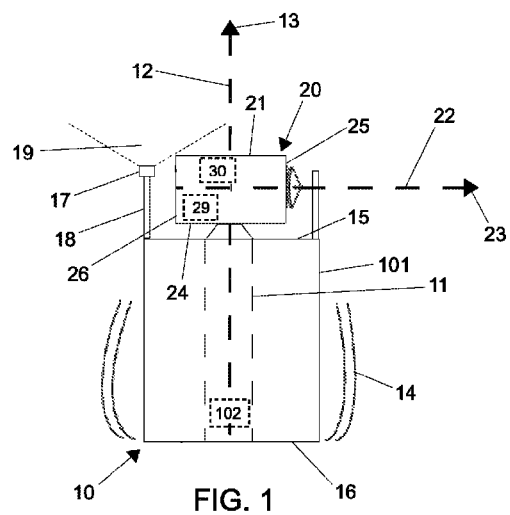
FIG. 1 schematically represents a satellite system according to a particular embodiment of the invention, comprising a single piggyback satellite.

A satellite system according to a particular embodiment of the invention is schematically represented in FIG. 1.

This system comprises a first satellite 10, called carrier satellite, and a second satellite 20, called piggyback satellite.

Each of these satellites is equipped with payloads, with sufficient power capacity to operate during its mission, with a propulsion system 102, 29 with a propellant reserve that are sufficient for the orbit keeping maneuvers, aiming to correct the position of the satellite on its mission orbit, and, if appropriate, for orbit-change maneuvers.

All of these elements are well known to those skilled in the art and will not be described in detail in the present description.

More particularly, the carrier satellite 10 comprises a substantially cylindrical rigid structure 11, called support structure, which is represented by dotted lines in FIG. 1, because it is arranged inside an outer jacket 101 of the carrier satellite, and which defines a longitudinal axis 12 of the carrier satellite 10, also called Earth axis. In the mission orbital position of the carrier satellite 10, this Earth axis 12 joins the center of mass of the satellite and the center of the Earth, the direction toward the Earth being indicated as 13 in FIG. 1.

In a manner that is conventional in itself, the carrier satellite 10 comprises solar energy collection means, in the form of generally deployable solar panels, not represented in FIG. 1. The carrier satellite 10 further comprises communication means using deployable reflector antennas 14, represented schematically in FIG. 1 in the folded-down launch configuration. The support structure 11 supports and protects the propulsion means, the electrical power supply, control and navigation, telemetry and communication and other such systems with which the satellite is equipped, as well as the electric wiring. All of these elements, arranged in the outer jacket 101 of the satellite, are not represented in FIG. 1.

The carrier satellite 10 comprises an Earth face 15 and an opposite anti-Earth face 16, which are globally substantially at right angles to the Earth axis 12.

Figure 4:
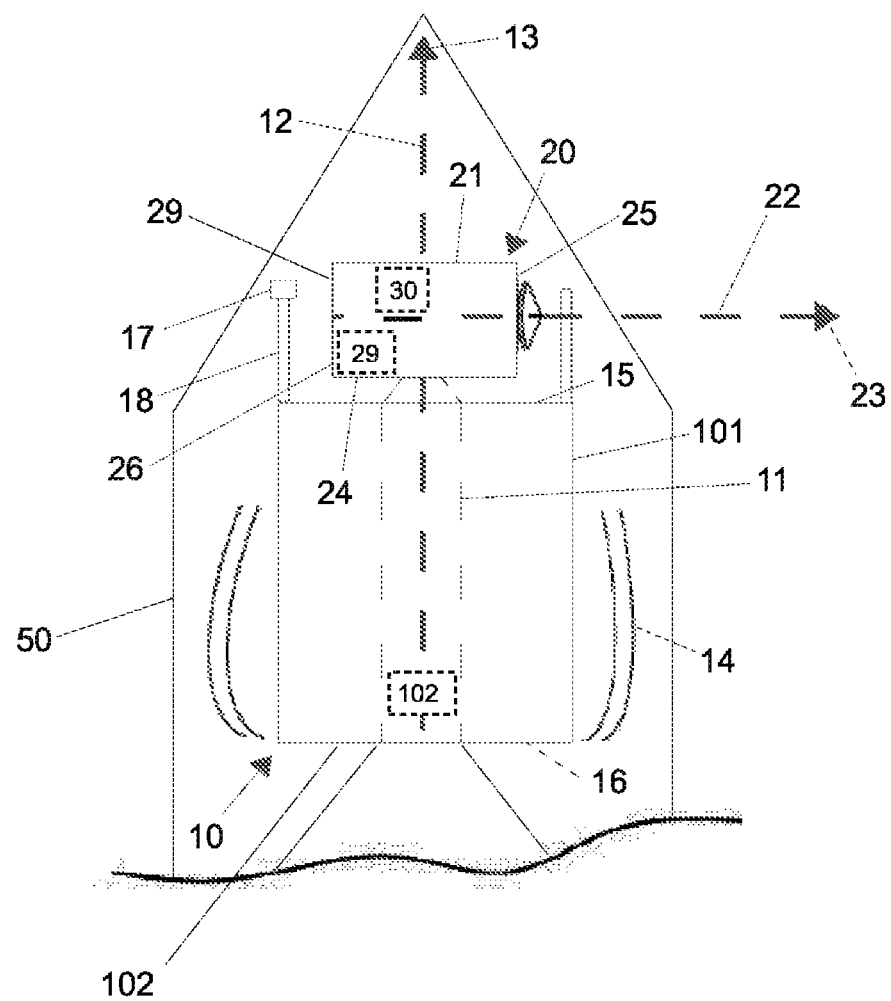
FIG. 4 is a schematic illustration of the carrier satellite and the piggyback satellite being arranged in a same launch vehicle.

The carrier satellite 10 is intended to be fixed, for its launch, to a launch vehicle 50, schematically represented in FIG. 4, via its anti Earth face 16. More specifically, the carrier satellite 10 is intended to be arranged under the fairing of the launch vehicle, the anti-Earth face 16 then being positioned facing the Earth's surface, in the normal launch configuration.

On its Earth face 15, the carrier satellite 10 bears sensors, deployable telemetry, control and other such antennas, one of which is represented by way of example in FIG. 1, identified by the reference 17, at the end of a mast 18 which can be dedicated to it or consist of an extension of a radiator of the satellite.

The propulsion means of the carrier satellite 10, comprising the propulsion system in itself, such as nozzles, valves, tanks, etc., and the propellant reserve, are configured in such a way as to be suitable for ensuring at least an orbit transfer of the system comprising the carrier satellite 10 and the piggyback satellite 20 from an initial orbit into which this system is injected by a launch vehicle, to a mission orbit of at least one of the carrier 10 and/or piggyback 20 satellites, and for keeping the carrier satellite 10 alone in mission orbit.

The piggyback satellite 20, which can be of the same class as the carrier satellite 10 or of a different class, comprises a structure 21, which defines its longitudinal axis, or Earth axis, 22. The direction of gaze toward the Earth of the piggyback satellite 20 in its mission orbit is indicated as 23 in FIG. 1.

The piggyback satellite 20 comprises, just like the carrier satellite 10, an Earth face 25 and an opposite anti-Earth face 26, both globally substantially at right angles to the Earth axis 22 of the satellite.

The propulsion means of the piggyback satellite 20, comprising the propulsion system in itself and the propellant reserve, are configured in such a way as to be suitable for ensuring at least its mission orbit-keeping. Preferentially, they are ill-suited to ensuring an orbit transfer of the piggyback satellite 20 from the initial orbit to its mission orbit, so that the weight and the volume occupied by the propulsion means are limited.

As illustrated in FIG. 1, the piggyback satellite 20 is fixed onto the Earth face 15 of the carrier satellite 10, directly above the support structure 11 of the carrier satellite 10. It is fixed there in such a way that its Earth axis 22 is substantially at right angles to the Earth axis 12 of the carrier satellite 10, that is to say that the Earth face 25 of the piggyback satellite 20 is globally substantially at right angles to the Earth face 15 of the carrier satellite 10, more specifically globally forms, with the latter, an angle of less than 10 degrees. The piggyback satellite 20 is thus fixed onto the carrier satellite 10 by a so-called lateral first face 24, distinct from the Earth 25 and anti-Earth 26 faces.

Such an arrangement of the piggyback satellite 20 on the carrier satellite 10 proves very advantageous in terms of optimization of the volume under the fairing of the launch vehicle. In effect, it makes it possible to stack, on the carrier satellite 10, a piggyback satellite 20 that has a significant volume, and notably an Earth face 25, which bears communication equipment, of large surface area. In such an arrangement, an increase in the volume of the piggyback satellite 20 is in fact advantageously little constrained by the dimensions of the fairing of the launch vehicle.

Furthermore, such an arrangement of the piggyback satellite 20 on the carrier satellite 10 advantageously makes it possible to easily accommodate, on the Earth face 15 of the carrier satellite 10, sensors and/or antennas 17 that require, particularly in the phase of orbit transfer of the system formed by the carrier satellite 10 and the piggyback satellite 20, from the initial orbit to the mission orbit, a wide field of view 19 including the Earth axis 12 of the carrier satellite 10. As illustrated in FIG. 1, obtaining such a result does not require the implementation of a mast 18 of very great length bearing the sensor or the antenna 17.

The piggyback satellite 20 is fixed onto the carrier satellite 10 by attachment means that can be released on command and without generating debris, for example by a series of pyrotechnic bolts.

The interface between the carrier satellite 10 and the piggyback satellite 20 is, furthermore, reduced to the minimum, and implemented in such a way that no data bus links the two satellites, or their avionics. The piggyback satellite 20 is advantageously configured to remain passive as long as it is fixed to the carrier satellite 10. The system comprises means for slaving the starting up of the piggyback satellite 20 to the releasing of the attachment means, so that the piggyback satellite 20 is automatically started up upon its separation from the carrier satellite 10. These slaving means are notably arranged in the piggyback satellite 20. For its part, the command to release the attachment means is preferentially implemented from the carrier satellite 10.

As long as the piggyback satellite 20 is attached to the carrier satellite 10, its avionics remaining off, the system is preferably configured in such a way that the carrier satellite 10 is able to heat up the piggyback satellite 20, via an extension to the piggyback satellite of its heating harness (not visible in FIG. 1). This heating harness is preferentially controlled and powered by means provided for this purpose and located in the carrier satellite 10.

The system can further comprise a so-called trickle charge mechanism making it possible to avoid the discharging of the batteries of the piggyback satellite 20 as long as the latter is fixed to the carrier satellite 10.

Figure 2:
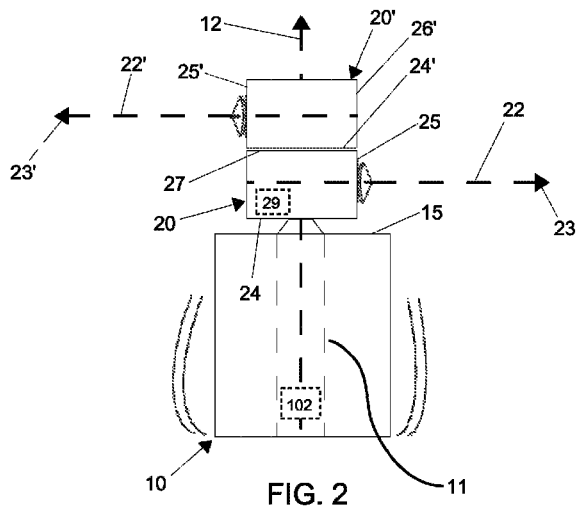
FIG. 2 schematically represents a satellite system according to a different particular embodiment of the invention, comprising two piggyback satellites.

A different embodiment of the satellite system according to the invention is schematically represented in FIG. 2.

This system comprises a carrier satellite 10 and a piggyback satellite 20, similar to those described above with reference to FIG. 1, and arranged similarly relative to one another.

It further comprises a second piggyback satellite 20', which can be identical to or different from the first piggyback satellite 20, but which does take on the features thereof described above, notably concerning the propulsion means.

This second piggyback satellite 20' comprises an Earth axis 22', an Earth face 25' and an opposite anti-Earth face 26'. It is stacked on the first piggyback satellite 20, in such a way that its Earth axis 22' is substantially at right angles to the Earth axis 12' of the carrier satellite 10, and substantially parallel to the Earth axis 22 of the first piggyback satellite 20. In the particular embodiment represented in FIG. 2, the second piggyback satellite 20' is fixed, by a so-called lateral face 24' distinct from the Earth face 25' and the anti-Earth face 26', to a lateral face 27 of the first piggyback satellite 20 opposite the first lateral face 24.

The stacking of the two piggyback satellites 20, 20' on the carrier satellite 10 is preferably done along the longitudinal axis 12 thereof.

In the particular embodiment represented in FIG. 2, the two piggyback satellites 20, 20' are for example arranged head-to-tail, that is to say that their respective Earth faces 25, 25' are arranged opposite one another. It is understood that other respective orientations of the Earth faces of the piggyback satellites can be envisaged.

The particular arrangement of the piggyback satellites relative to the carrier satellite according to the invention makes it possible to stack thereon a plurality of piggyback satellites one on top of the other, by occupying the volume available under the fairing of the launch vehicle optimally, and by having the weight of the piggyback satellites supported by the support structure 11 of the carrier satellite 10, which is intrinsically strong enough for this purpose. This stacking thus advantageously does not require any specific modification of the structure of the carrier satellite 10.

The second piggyback satellite 20' is fixed onto the first piggyback satellite 20 by attachment means, which can be released on command for the separation of the piggyback satellites from one another. The release command for these attachment means can be implemented from the carrier satellite 10, or from the first piggyback satellite 20, depending on the sequence of separation of all of these satellites that is envisaged.

Figure 3:
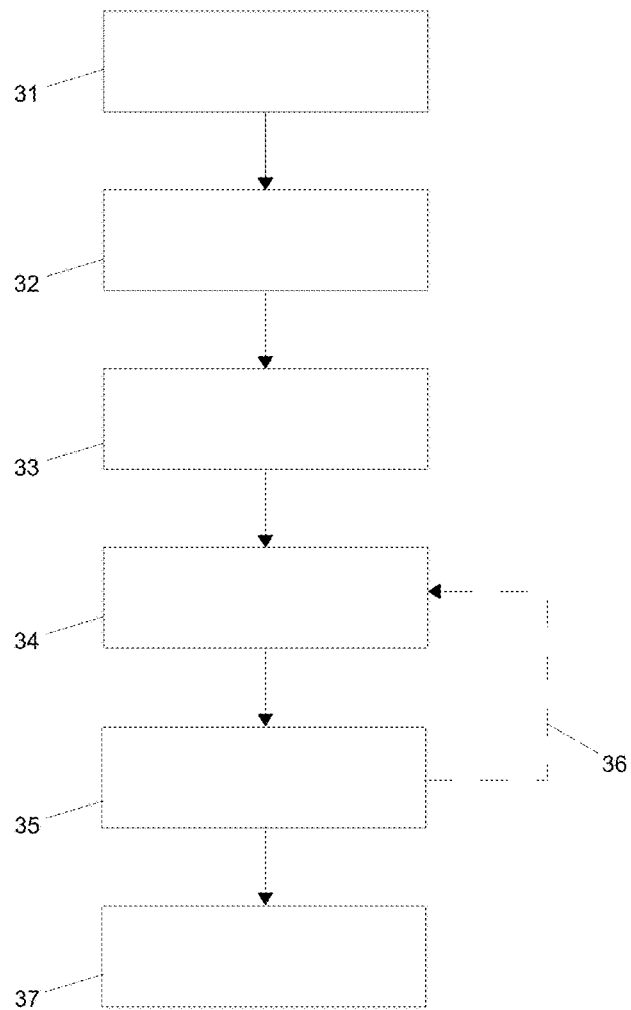
FIG. 3 is a block diagram illustrating the steps of a method for stationing the satellites of the satellite system of FIG. 1 or of FIG. 2.

The different steps of a nonlimiting exemplary method for stationing, on their mission orbit, satellites of the satellite systems described above with reference to FIGS. 1 and 2, are schematically illustrated in FIG. 3.

In a first step 31, the piggyback satellite 20 is fixed onto the carrier satellite 10, by attachment means, such that the respective Earth faces 15, 25 of these satellites are arranged globally substantially at right angles to one another. These operations are performed on the Earth's surface.

In a second step 32, the duly formed satellite system is assembled under the fairing of a launch vehicle, in a manner that is conventional in itself.

The next step 33 consists of the launch from the Earth's surface and the injection of the satellite system, still with the satellites fixed to one another, into the initial orbit, for example a geostationary transfer orbit.

The satellite system is then transferred, in a step 34, by means of the propulsion system of the carrier satellite 10, into the mission orbit of the piggyback satellite 20, for example the geostationary orbit.

The next step 35 is the separation of the piggyback satellite 20 and of the carrier satellite 10, by the releasing of the attachment means triggered by the carrier satellite 10.

When the system comprises a plurality of piggyback satellites 20, 20', all of these piggyback satellites can be detached from the carrier satellite 10 in this step. Otherwise, the steps 34 and 35 can be reiterated for each piggyback satellite, as indicated at 36 in FIG. 3.

Finally, in a final step 37, each satellite is brought, by its own propulsion system, into its operational position.

Each of these steps is performed in a manner that is conventional in itself.

The exemplary method according to the invention schematically described above is in no way limiting on the invention, and any variant falls equally within the scope of the invention.

The invention claimed is:
1. A satellite system, comprising:
a first satellite, called carrier satellite; and
a second satellite, called piggyback satellite, said piggyback satellite being releasably fixed to said carrier satellite, said piggyback satellite being releasable, on command, from said carrier satellite to provoke separation of said carrier satellite and from said piggyback satellite,
each of said carrier and piggyback satellites comprising an Earth face, wherein,
said piggyback satellite comprises:
a first propulsion system with
a first propellant reserve suitable for keeping said piggyback satellite in orbit, and
said carrier satellite comprises:
a second propulsion system with
a second propellant reserve configured to perform a change of orbit of said carrier satellite and of said piggyback satellite fixed to said carrier satellite, and
said piggyback satellite is fixed onto the Earth face of the carrier satellite, such that the Earth face of said piggyback satellite is substantially at right angles to the Earth face of said carrier satellite.

2. The satellite system as claimed in claim 1, wherein the carrier satellite and the piggyback satellite are arranged in a same launch vehicle.

3. The satellite system as claimed in claim 1, wherein the carrier satellite and the piggyback satellite do not share any data bus.

4. The satellite system as claimed in claim 1, wherein the piggyback satellite remains passive while fixed to the carrier satellite, and becomes active when separated from the carrier satellite.

5. The satellite system as claimed in claim 1, wherein the carrier satellite comprises a substantially cylindrical rigid support structure which defines a longitudinal axis of said carrier satellite extending between the Earth face and an opposite anti-Earth face of said carrier satellite, and said piggyback satellite is fixed onto said support structure.

6. The satellite system as claimed in claim 1, further comprising heating lines located in said piggyback satellite.

7. The satellite system as claimed in claim 1, comprising a plurality of piggyback satellites stacked one on top of the other on the Earth face of the carrier satellite, the Earth face of each of said piggyback satellites being substantially at right angles to said Earth face of said carrier satellite.

8. A method for stationing on a mission orbit at least one of the satellites of a set of satellites comprising a first satellite, called carrier satellite, and a second satellite, called piggyback satellite, each of said satellites comprising an Earth face, said method comprising steps of:
  a) forming a satellite system as claimed in claim 1,
  b) placing said satellite system in a launch vehicle suitable for transferring the satellite system from the Earth's surface to an initial orbit,
  c) injecting said satellite system into said initial orbit by said launch vehicle,
  d) transferring said satellite system, by the propulsion system of said carrier satellite, into or in proximity to the mission orbit of said piggyback satellite, and
  e) separating said piggyback satellite from said carrier satellite.

9. The method as claimed in claim 8, wherein step a) comprises:
  forming a satellite system comprising a plurality of piggyback satellites stacked one on top of the other on the Earth face of the carrier satellite, the Earth face of each of said piggyback satellites being substantially at right angles to said Earth face of said carrier satellite, and
  and repeating steps d) and e) for each of said piggyback satellites.

10. The method as claimed in claim 8, further comprising, after step e), a step f) of transferring said carrier satellite into a carrier satellite orbit.

11. The method as claimed in claim 10, wherein the mission orbit of the carrier satellite is a geostationary orbit.

12. The method as claimed in claim 8, wherein the mission orbit of the piggyback satellite is a geostationary orbit.

13. A satellite system, comprising:
  a first self-propelled satellite configured for changing an orbit of the satellite system, the first self-propelled satellite being called a carrier satellite; and
  a second self-propelled satellite, called a piggyback satellite, said piggyback satellite being releasably fixed to said carrier satellite, said piggyback satellite being releasable, on command, from said carrier satellite to provoke separation of said carrier satellite and from said piggyback satellite,
  wherein each of said carrier and piggyback satellites comprises an Earth face, and
  wherein said piggyback satellite is fixed onto the Earth face of the carrier satellite, such that the Earth face of said piggyback satellite is substantially at right angles to the Earth face of said carrier satellite.

\* \* \* \* \*